United States Patent [19]

Kirk

[11] 4,261,328

[45] Apr. 14, 1981

[54] TEAKETTLE WITH ATTACHED BOILING VESSEL

[76] Inventor: Norbert A. Kirk, 43 E. Ohio St., Room 930, Chicago, Ill. 60611

[21] Appl. No.: 65,511

[22] Filed: Aug. 10, 1979

[51] Int. Cl.³ .......................... A47J 27/00; A23P 1/00
[52] U.S. Cl. .................................... 126/392; 99/440; 126/388
[58] Field of Search ............... 126/345, 388, 373, 376, 126/377, 375, 392; 99/339, 440, 416, 403; 220/85 H

[56] References Cited

U.S. PATENT DOCUMENTS

| | | | |
|---|---|---|---|
| 634,557 | 10/1899 | Halstead | 126/377 |
| 1,277,253 | 8/1918 | Paschel | 126/376 |
| 2,039,477 | 5/1936 | Edgar | 126/388 |
| 3,396,655 | 8/1968 | Yoshida | 99/335 |

FOREIGN PATENT DOCUMENTS 525424  9/1922  France .................... 126/392

*Primary Examiner*—Samuel Scott
*Assistant Examiner*—G. Anderson
*Attorney, Agent, or Firm*—Larson, Taylor and Hinds

[57] ABSTRACT

A whistling teakettle with an attached food boiling device is disclosed which is especially suitable for soft-boiling eggs and the like. Both the teakettle and the boiling device are designed to be exposed to a burner surface. However, due to the decreased volume of water in the boiling device, this water boils sooner than the water in the teakettle. Thus, a food, such as eggs, placed in the boiling device is cooked during the same time that water in the teakettle reaches a boil and causes the teakettle to "whistle". By measuring the volume of water in the teakettle, the "whistle" of the teakettle is used as a timed alarm for the cooking of the eggs.

2 Claims, 5 Drawing Figures

U.S. Patent    Apr. 14, 1981    4,261,328
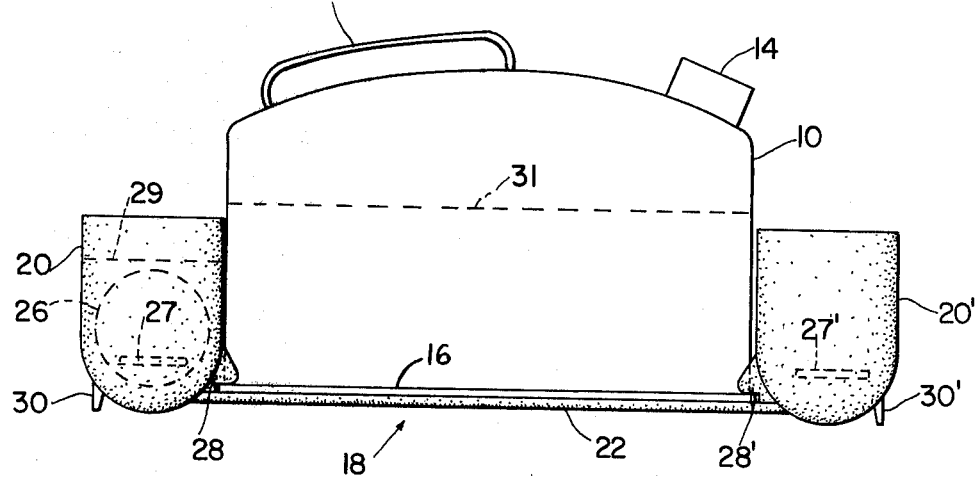
FIG. 1
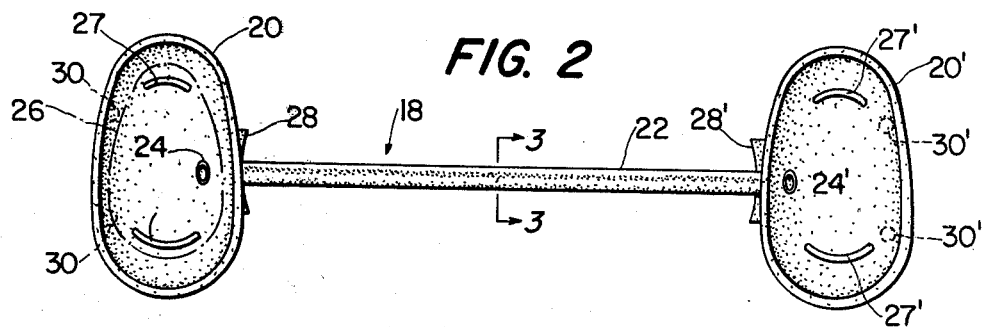
FIG. 2
FIG. 3
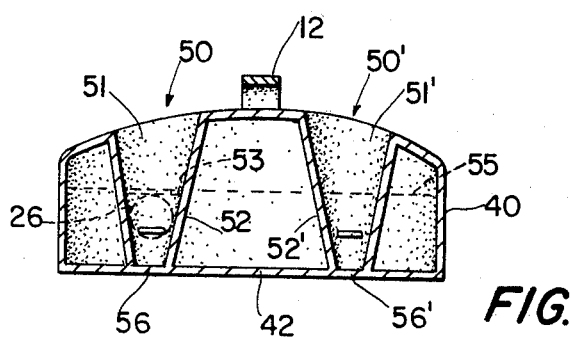
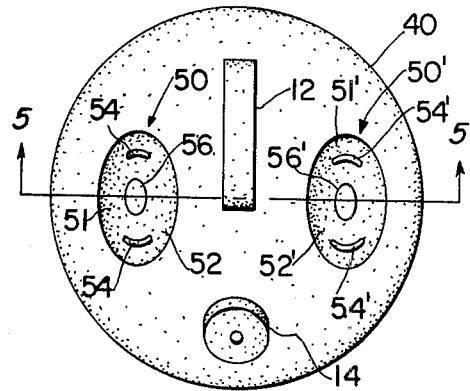
FIG. 4
FIG. 5

TEAKETTLE WITH ATTACHED BOILING VESSEL

FIELD OF THE INVENTION

This invention relates generally to apparatus for boiling water and more particularly to a teakettle with an attached boiling device which is used on a single burner to cook food at the same time that clean boiling water for coffee or the like is prepared.

BACKGROUND OF THE INVENTION

There are a variety of different apparatus which have been disclosed in the prior art for the cooking of food by boiling. In particular, there has been disclosed a number of devices which are designed to boil eggs. For example, in U.S. Pat. No. 1,433,824 to Jensen, a device is disclosed in which individual whole eggs are placed in individual receptacles which are in fluid communication with each other. When the device is placed upon a stove, a small amount of water placed in each receptacle quickly boils and cooks the eggs. Another device, disclosed in U.S. Pat. No. 1,063,609 to Shaw and Chapman, receives an egg and is then placed inside of a boiling kettle. However, none of these devices disclose any associated means for timing the cooking of the egg.

One of the simplest devices which times the cooking of eggs is disclosed in U.S. Pat. No. 578,059. In this patent, a kettle in which the eggs are boiled is provided with a lid having a time alarm clock mounted thereon. Another timer and alarm is disclosed in U.S. Pat. No. 580,815 to Witte. In this patent, the timer consists of a metal tube with a small hole in the bottom which is filled with water and which is mounted on a lever. When all of the water finally leaks out of the tube, the lever moves and hits a bell indicating that a time period has passed. A rather complicated timer dependent on the rate of steam generation and leakage is disclosed in U.S. Pat. No. 2,536,369 to Hubbard. The device disclosed in this patent is designed to boil an egg inside of a closed kettle. While some steam escapes through a selected sized opening, the steam pressure in the kettle continues to rise until a pop valve is actuated allowing steam to pass through a whistle on the kettle.

While all of the above devices may function to produce a boiled egg, there are a number of disadvantages with each device. For example, in all of the devices except the device disclosed in Jensen, a large volume of water must be boiled. This is very inefficient and a waste of heating energy. Devices without timers also necessitate some external means of measuring the cooking period.

SUMMARY OF THE INVENTION

In accordance with the present invention, a whistling teakettle and food boiling device is provided for cooking eggs or the like. The device is capable of boiling water, for coffee, for example, at the same time that eggs are boiled in a separate device. In addition, the volume of the food boiling device is designed to be less than the volume of the teakettle. Thus, as the device is exposed to a heat source, the water in the food boiling device reaches boiling before the water in the teakettle. By selecting appropriate volumes, the "whistling" teakettle is used to signal both the boiling of water in the teakettle and the completion of cooking in the food boiling device.

It is a feature of the present invention that the "whistling" of the teakettle signals both the completion of cooking in the food boiling device as well as the boiling of water in the teakettle. It is a further feature of the present invention that both the food boiling device and the teakettle are heated on the same burner at the same time. Thus, not only is a single burner used where two would normally be used, but approximately the same energy which would be used to boil water in the teakettle now cooks the eggs as well. Consequently, almost all of the energy which would have been used to boil eggs in a separate pan has been saved.

Other features and advantages of the present invention are stated in or apparent from the detailed description of presently preferred embodiments of the invention found hereinbelow.

BRIEF DESCRIPTION OF THE DRAWINGS

FIG. 1 is a schematic front view of one preferred embodiment of the teakettle and food boiling device of the present invention.

FIG. 2 is a schematic top view of the food boiling device shown in FIG. 1.

FIG. 3 is a cross-sectional view taken along the line 3—3 in FIG. 2.

FIG. 4 is a schematic top view of another preferred embodiment of the present invention.

FIG. 5 is a cross-sectional view taken along the line 5—5 in FIG. 4.

DETAILED DESCRIPTION OF THE PREFERRED EMBODIMENTS

With reference now to the drawings in which like numerals represent like elements throughout the several views, a presently preferred embodiment of the present invention is depicted in FIGS. 1 to 3 and comprises a conventional teakettle 10 and a food boiling device 18. Teakettle 10 includes a handle 12 and a whistling spout 14. Whistling spout 14, which is well-known in the art, has a small hole that causes a whistling noise when steam generated inside of teakettle 10 exits through the hole. Located at the base of teakettle 10 is a small rim 16.

Food boiling device 18 comprises two boiling vessels 20 and 20' which are attached to a flat metal tube 22 which fluidly connects boiling vessels 20 and 20'. Tube 22 communicates with the interior of each vessel 20 and 20' by ports 24 and 24' which are located near the bottom of each vessel 20 and 20'. As shown in FIG. 2, vessels 20 and 20' are egg-shaped and slightly larger than an egg 26 (shown in phantom) which is placed inside vessel 20 for cooking. Inside of vessel 20', egg 26 rests on a pair of opposed protuberances 27'. On the outside of each vessel 20 and 20', located just above tube 22, is a projection 28 and 28' which are designed to ride on rim 16 of teakettle 10. The upper portion of projection 28 and 28' are contoured to the curvature of teakettle 10. Each vessel 20 and 20' also has two legs 30 or 30' so that the food boiling device can be free-standing.

In operation, teakettle 10 and food boiling device 18 operate in the following manner when the user desires, for example, hot water for coffee, tea or cocoa and a boiled food such as egg 26. First, food boiling device 18 is attached to teakettle 10. By manufacturing tube 22 to the proper length, vessels 20 and 20' are releasably held on teakettle 10 and supported by projections 28 and 28' which ride on rim 16 and engage teakettle 10 at the upper portions. Next, eggs 26 are placed in each vessel 20 and 20' so that each egg rests upon protuberances 27 and 27'. Water is then added to vessel 20, and this water flows through tube 22 to the other vessel 20'. Enough water is added to just cover the eggs 26, as indicated by dotted line 29. Finally, water is also added to teakettle 10, as indicated by dotted line 31. Teakettle 10 and attached boiling device 18 are then placed upon the same burner. As the burner heats up, the limited volume of water in tube 22 begins to boil. The steam generated in tube 22 travels to boiling vessels 20 and 20', heating up the water in boiling vessels 20 and 20' and ultimately cooking eggs 26 therein. The steam exiting ports 24 and 24' impinge on eggs 26 causing eggs 26 to rotate in boiling vessels 20 and 20'.

At the same time as tube 22 is heated, the water in teakettle 10 also heats up and ultimately begins to boil, causing whistling spout 14 to "whistle". However, the water in boiling vessels 20 and 20' reaches boiling before the water in teakettle 10. This is due to the proportionately large area of tube 22 which generates steam to heat the small volume of water in boiling vessels 20 and 20'. Many variables affect the time period between the boiling of the water in boiling vessels 20 and 20' and in teakettle 10. However, by trial and error, the user determines how much water should be added to teakettle 10 to achieve a predetermined time period at a predetermined heat setting of the burner. For this purpose, a simple measuring cup will suffice to accurately measure the volume of water placed in teakettle 10. Alternatively, graduated markings can be placed on the outside walls of teakettle 10 to indicate the height of water inside teakettle 10. The volume of water in boiling vessels 20 and 20' will of course be almost the same each time they are used because the water will just cover the eggs 26. Therefore, by measuring the volume of water in teakettle 10, a predetermined time period passes between the boiling of the water in boiling vessels 20 and 20' and the "whistle" of whistling spout 14 caused by the boiling of water in teakettle 10. This predetermined time period allows eggs 26 to be fully cooked in the time it takes the water in teakettle 10 to reach boiling. Consequently, when the "whistle" sounds, both eggs 26 and hot water for coffee, tea or cocoa are ready.

Another preferred embodiment of the present invention is depicted in FIGS. 4 and 5 and comprises a teakettle 40 with an integral pair of food boiling devices 50 and 50'. Teakettle 40 has a base 42 as well as a handle 12 and whistling spout 14 as described above. Food boiling devices 50 and 50' have boiling vessels 51 and 51' which are disposed inside of teakettle 40. Boiling vessels 51 and 51' have walls 52 and 52' which are oval in cross-section as viewed from the top, and which are tapered inwardly and downwardly as they extend from the openings in teakettle 40 to base 42. Preferably oval walls 52 and 52' are formed of a heat insulating material. Boiling vessels 51 and 51' are preferably egg-shaped and slightly larger than an egg. Inside of each boiling vessel 51 and 51' are an opposed pair of protuberances 54 and 54' extending out from arcuate walls 52 and 52' on which an egg 26 can rest. Each boiling vessel has a bottom 56 and 56' which is preferably merely a portion of base 42.

In operation, the embodiment of the present invention depicted in FIGS. 4 and 5 functions much the same as the embodiment previously described. First an egg is placed in each boiling vessel 51 and 51' and water is then added to cover the egg as shown by dotted line 53. Next a measured volume of water is added to the interior of teakettle 40 as shown by dotted line 55. When teakettle 40 is then placed upon a burner, both the water in boiling vessels 50 and 50' and in teakettle 40 are heated. However, due to the proportionately large area of bottom 56 and 56' heating the small volume of water in boiling vessels 51 and 51' surrounded by insulated arcuate walls 52 and 52', the water in boiling vessels 51 and 51' boils before the water in teakettle 40. For example, it would take approximately two-thirds of a cup of water to fill both boiling vessels 51 and 51' and bottoms 56 and 56' heating this water would be approximately 4 square inches, producing a ratio of one-sixth cups per square inch. On the other hand, approximately eight cups of water are placed in teakettle 40 having approximately a thirty-six square inch base, for a ratio of one-fourth cups per square inch. Again, the time period between the boiling of water in boiling vessel 51 and 51' and the boiling of water in teakettle 40 is determined by the initial volume of water placed in teakettle 40. Therefore, when whistling spout 14 sounds off, the eggs in boiling devices 50 and 50' are cooked and hot water for coffee is ready in teakettle 40.

While eggs have been used as an example of foods which can be boiled in boiling devices 18 or 50, it should be appreciated that other foods can be similarly cooked. For instance, small wieners used as hors d'oeuvres can be boiled in boiling devices 18 or 50.

It may be desirable to provide lids for boiling vessels 20 and 50. The lids would not only prevent the water in the boiling vessels from boiling away or spilling out, but they would also cause the water to boil sooner by trapping the heat in the boiling vessels.

Although the invention has been described in detail with respect to exemplary embodiments thereof, it will be understood by those of ordinary skill in the art that variations and modifications may be effected within the scope and spirit of the invention.

I claim:

1. A water boiling and food cooking apparatus adapted to be heated by a burner comprising, in combination:

a teakettle having a surface adapted to be heated by the burner, said teakettle including means for producing a whistle which is actuated by rapidly boiling water;

a separate boiling device comprising a pair of boiling vessels each of which has a much smaller volume than said teakettle, said device being attached to the exterior surface of said teakettle and having a lower portion which is adapted to be heated by the same burner heating said teakettle said lower portion comprising a tube extending between the bottoms of said boiling vessels which provides fluid communication between said boiling vessels, said tube being positioned to be exposed to a burner on which the teakettle is placed, such that during the time that it takes water in said teakettle to boil and produce a whistle, food deposited in said device is cooked by boiling.

2. An apparatus as claimed in claim 1 wherein said teakettle has a rim at the base, and further including an inwardly facing projection on each boiling vessel which is designed to ride on the rim of said teakettle so that said connected boiling vessels are removably attached to said teakettle.

* * * * *